United States Patent [19]

Sala

[11] Patent Number: 4,936,412
[45] Date of Patent: Jun. 26, 1990

[54] SILENCER FOR THE EXHAUST GAS OF MOTOR VEHICLE INTERNAL COMBUSTION ENGINES

[75] Inventor: Alberto Sala, Milan, Italy

[73] Assignee: Alfa Lancia Industriale S.p.A., Arese, Italy

[21] Appl. No.: 380,321

[22] Filed: Jul. 17, 1989

[30] Foreign Application Priority Data

Jul. 25, 1988 [IT] Italy .................. 21472A/88

[51] Int. Cl.⁵ .............. F01N 1/24; F01N 7/00
[52] U.S. Cl. .................. 181/282; 181/252; 181/269
[58] Field of Search ........... 181/212, 243, 227, 272, 181/282, 252, 269

[56] References Cited

U.S. PATENT DOCUMENTS

| | | | |
|---|---|---|---|
| 3,259,206 | 7/1966 | Straw | 181/227 |
| 4,315,558 | 2/1982 | Katayama | 181/227 |
| 4,415,059 | 11/1983 | Hayashi | 181/272 X |
| 4,513,841 | 4/1985 | Shimoji et al. | 181/252 |
| 4,540,064 | 9/1985 | Fujimura | 181/227 |
| 4,821,840 | 4/1989 | Harwood et al. | 181/282 |

FOREIGN PATENT DOCUMENTS 2407471 8/1975 Fed. Rep. of Germany .
3120212 12/1982 Fed. Rep. of Germany .
3346609 7/1985 Fed. Rep. of Germany .

*Primary Examiner*—Benjamin R. Fuller
*Attorney, Agent, or Firm*—Charles E. Brown; Charles A. Brown

[57] ABSTRACT

A silencer for the exhaust gas of motor vehicle internal combustion engines is proposed comprising an outer wall having in its upper part a deformable zone, preferably in the form of a transverse indentation, which provides preferential deformation under impact, and if a rear impact occurs prevents the silencer from rigidly striking the most inner structure of the vehicle floor and the fuel tank.

8 Claims, 2 Drawing Sheets

SILENCER FOR THE EXHAUST GAS OF MOTOR VEHICLE INTERNAL COMBUSTION ENGINES

BACKGROUND OF THE INVENTION

This invention relates to a silencer for motor vehicle internal combustion engines, particularly suitable for vehicles in which the silencer and fuel tank or feed circuit elements are connected to the vehicle rear floor in such a manner as to cause mutual interference on impact.

In this respect, with such an arrangement if the vehicle suffers a rear impact at a certain speed the silencer can be struck by the sheet metal of the tail end and floor as they deform.

If the impact energy is high, the rigidity of the silencer structure means that, as only a minimum part of the energy is dissipated in deforming the tail and floor, the silencer moves rigidly and practically underformed against the most inner region of the floor, aided by the considerable yieldability of the exhaust pipers upstream of the silencer.

The silencer can therefore strike and considerably deform the most inner structure of the floor, and strike the fuel tank causing deformation and possible fracture of its walls or of the connections to the fuel inlet and outlet pipes, with the danger of fuel leakage.

The object of the present invention is to provide a silencer which on impact cannot rigidly strike the floor inner structure or fuel tank, and in fact is able to contribute to impact energy dissipation, even if only partially.

SUMMARY OF THE IMVENTION

The silencer according to the invention is provided with an outer wall which encloses sound attenuation means and is connected to the silencer exhaust gas inlet and oulet pipes, the silencer being characterised in that the outer wall comprises at least one zone of preferential deformation under impact.

Preferably, the preferential deformation zone is provided in the upper part of the outer wall. The zone consists of a substantially transverse indentation. This is preferably shaped so that its concavity faces outwards from the silencer. In addition, the internal geometry of the silencer is such as to favour deformation in the collapse zone.

By this means, the silencer folds at the preferential deformation zone when struck by the body which collides with the vehicle tail. In particular, it folds by bending downwards if the preferential deformation zone is provided in the upper part of the outer wall. The silencer in this folded state rests against the most inner structure of the floor and against the fuel tank without striking then with force, as would instead happen if it were displaced without undergoing deformation, thus preventing fracture of the tank or separation of feed circuit components, with cooresponding leakage of fuel.

Characteristics and advantages of the invention are described hereafter with reference to FIGS. 1 to 6 which show preferred embodiments of the invention by way of non-limiting example.

DESCRIPTION OF THE PREFERRED EMBODIMENT

Figure 1:
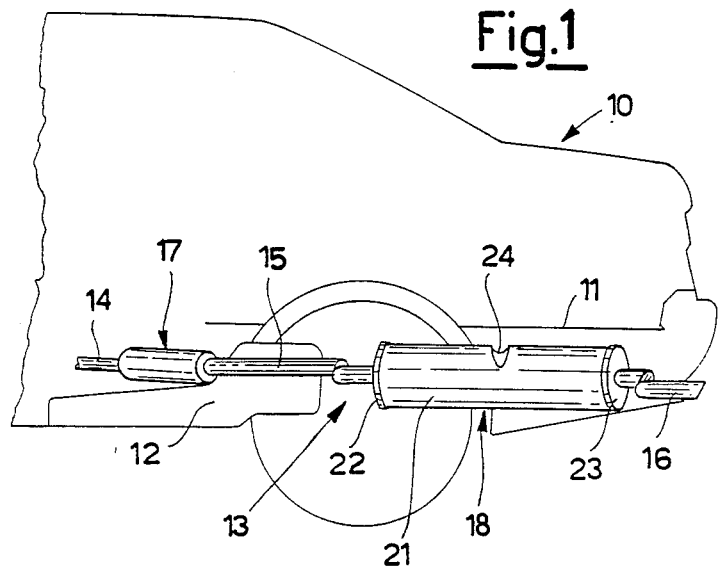
FIG. 1 is a view of a motor vehicle tail, shown partly in longitudinal section, provided with a silencer according to the invention.

In FIG. 1 the reference numeral 10 indicates overall an automobile tail and 11 indicates its rear floor; 12 indicates the fuel tank fixed to said floor 11 and 13 indicates overall the engine exhaust system, only partly shown which is fixed in known manner to the floor 11.

Figure 4:
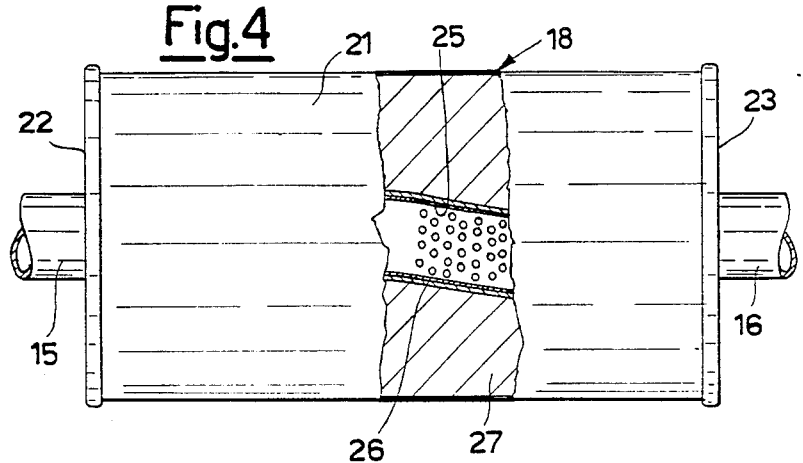
FIG. 4 is a partly sectional view analogous to FIG. 3.

The exhaust system comprises pipes 14, 15, 16, and silencers indicated overall by 17 and 18. The silencers 17 and 18 are provided with repective outer walls which contain selected sound attenuation means such as expansion chambers, absorption chambers, or Helmholtz resonators. FIG. 4 shows part of an absorption chamber, in which the partly perforated tube 25 is wrapped with a steel wool blanket 26 and a rockwool blanket 27.

Figure 2:
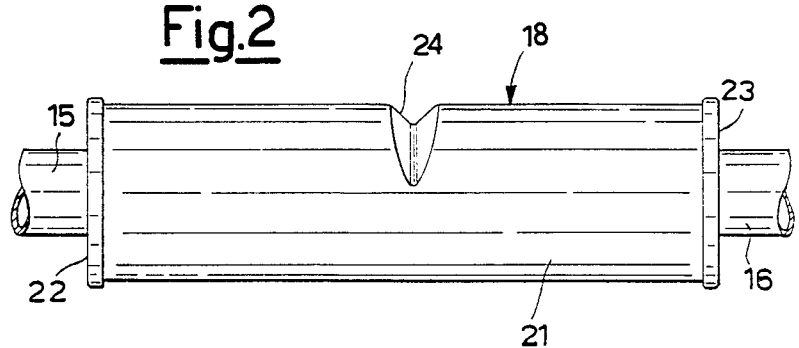
FIG. 2 is an enlarged side view of the silencer of FIG. 1.
Figure 3:
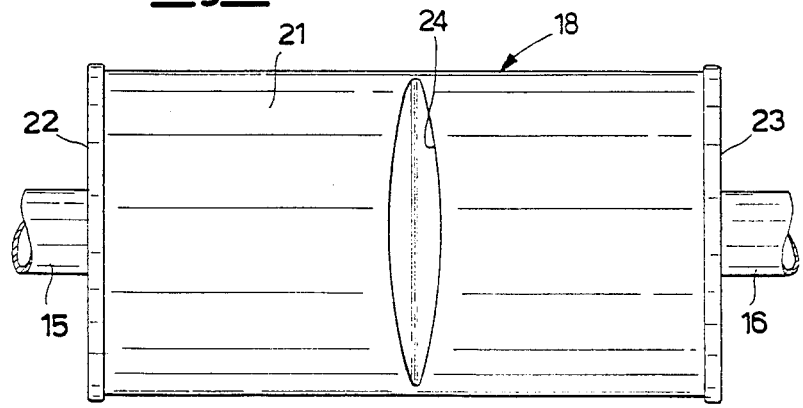
FIG. 3 is a plane view of the silencer of FIG. 2.

As shown in FIGS. 2 and 3, the outer wall is formed from a substantially cylindrical shell 21 and two end walls which are clinched onto the shell and are connected to the pipes 15 and 16 for exhaust gas entry and exit to and from the silencer 18.

The reference numeral 24 indicates a transverse indentation provided preferably in the upper part of the shell 21 and having its concavity facing outwards from the silencer 18. The shell 21 can be formed by pressing and clinching two sheet metal haft-shells or by shaping and clinching a metal sheet. The end walls 22 and 23 are then clinched to th shell 21. In both cases, the transverse indentation 24 can be provided in the upper part of the shell 21 by using a suitable die. The internal geometry of the silencer is such as to facilitate deformation in the a collapse or weakening zone.

In the indentation zone 24 the exhause gas preferably flows through only one tube, which is either preforated such as that indicated by 25 in FIG. 4, or comprises gaps.

Figure 5:
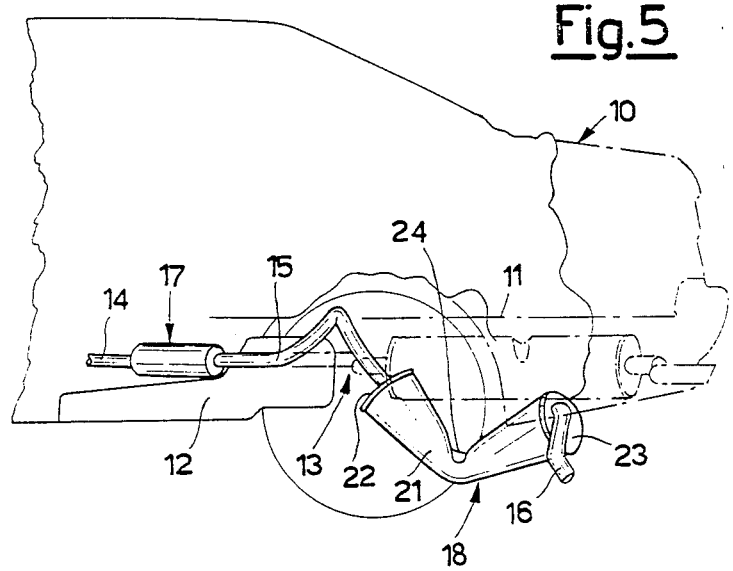
FIG. 5 is a view analogous to FIG. 1 after the vehicle has suffered a rear impact.

If vehicle suffers a rear impact, the sheet metal of the tail 10 and floor 11 deforms to thus dissipate impact energy, and the silencer 18 folds by bending downwards as shown by the full lines in FIG. 5, due to the presence of the transverse indentation 24 provided in the upper part of its substantially cylindrical shell 21, and representing a preferential deformation zone.

Figure 6:
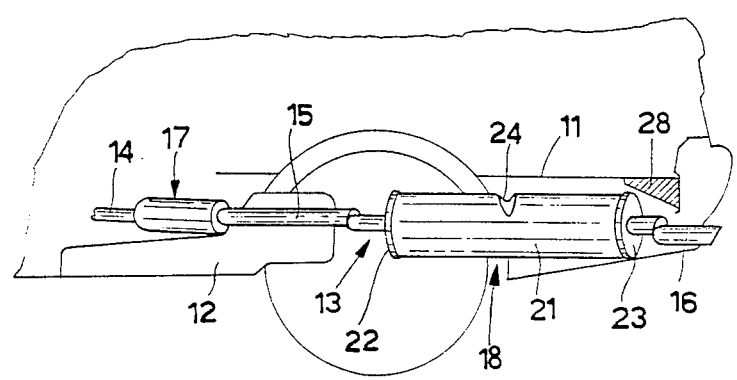
FIG. 6 is a modification of the embodiment of FIG. 1.

By folding, the silencer contributes to the impact energy dissipation to a certain though modest degree, and comes to rest against the most inner structure of the floor 11 and against the tank 12 without striking them forcibly, as instead would happen if the indentation 24 were not provided, in that the silencer would retract and rigidly strike the floor structure and tank. In the embodiment of FIG. 6 the common elements are indicated by the same reference numerals as in FIG. 1; in addition a wedge 28 able on rear impact to push the silencer downwards is fixed to the floor 11.

This expedient can be useful if vertical walls which could interfere with the silencer 18 are rigid with the floor 11, in order to prevent the silencer being able to move towards the most inner region of the floor during the initial stage of the impact before it begins to deform.

By the action of the wedge 28, the silencer 18 moves downwards and is then struck by the body which has collided with the tail 10 after the sheet metal of the tail and floor is already partly deformed.

After the silencer 18 has been struck it folds by bending downwards due to the presence of the indentation 24, in the manner already described with reference to FIGS. 1 to 5

I claim:

1. A silencer for exhaust gas of a motor vehicle internal combustion engine with said silencer being mountable to a rear floor of the vehicle, said silencer having an outer shell and two opposed end walls affixed to said outer shell to define a chamber therein, said silencer having sound attenuation means enclosed within, said chamber, said silencer having an exhaust gas inlet pipe connected to a first of said end walls and an exhaust gas outlet pipe connected to an other of said end walls whereby the exhaust gas is passed to and through said silencer, said outer shell having at least one weakening zone located in said outer shell whereby said silencer will collapse when subjected to an impact resulting from a vehicle collision.

2. The silencer as claimed in claim 1, wherein said weakening zone is provided in an upper part of said outer shell.

3. The silencer as claimed in claim 1, wherein said weakening zone consists of a substantially transverse indentation.

4. The silencer as claimed in claim 2, wherein said weakening zone consists of a substantially transverse indentation.

5. The silencer as claimed in claim 3, wherein said indentation has a concave surface and said concave surface faces ouwards from said silencer.

6. The silencer as claimed in claim 2, wherein said chamber of said silencer has an inner tube through which the exhaust gas passes, said inner tube has a partly perforated portion, and said perforated portion is positioned in correspondence with said weakening zone.

7. A motor vehicle having a longitudinal length and a silencer for exhaust gas of an internal combustion engien of the vehicle, said silencer having walls substantially cylindrical in shape and having an axis along the cylindrical shape walls, said silencer having an inlet and an outlet disposed at opposite ends of said cylindrical shaped walls, said silencer being mounted to a rear floor of the vehicle with the axis of the silencer being substantially parallel to the longitudinal length of the vehicle, said silencer having at least one weakening zone located in at least one of said cylindrical shaped walls whereby said silencer will collapse when subjected to an impact resulting from a vehicle collision.

8. The silencer as claimed in claim 7, wherein a wedge is fixed to the floor of the vehicle in close proximity with said silencer, whereby said wedge when subjected to the impact resulting from the collision urges said silencer downwards at said weakening zone.

* * * * *